United States Patent [19]
Wiegand

[11] 3,766,801
[45] Oct. 23, 1973

[54] ACTUATOR ASSEMBLY
[75] Inventor: Hans Wiegand, Boyertown, Pa.
[73] Assignee: Teleflex, Incorporated, North Wales, Pa.
[22] Filed: Oct. 27, 1971
[21] Appl. No.: 193,029

[52] U.S. Cl. .............................. 74/480 B, 74/496
[51] Int. Cl............................................ G05g 11/00
[58] Field of Search ............ 74/480 B, 496, 501 R, 74/501 P, 494; 220/4 B, 4 E; 308/237 R

[56] References Cited
UNITED STATES PATENTS

| | | | |
|---|---|---|---|
| 2,710,235 | 6/1955 | Olsen | 308/237 R |
| 3,206,998 | 9/1965 | Matz et al. | 74/480 B X |
| 3,400,226 | 9/1968 | Krumreich et al. | 220/4 B X |
| 3,208,620 | 9/1965 | Herdering | 220/4 E |
| 3,258,989 | 7/1966 | Frese et al. | 74/501 |

Primary Examiner—Milton Kaufman
Assistant Examiner—Frank H. McKenzie, Jr.
Attorney—Gerald E. McGlynn, Jr. et al.

[57] ABSTRACT

A rotary actuator assembly of the type for longitudinally moving a flexible motion transmitting core element to transmit motion in a curved path. The assembly includes a housing comprising a base and a cover which are snapped together and wherein the base and cover are made of plastic. An annular axle portion is integral with the base and extends toward the cover and rotatably supports a circular drive means which includes an internal gear and a peripheral groove for receiving a core element. A shaft is rotatably supported by the housing and supports a pinion which engages the internal gear. A barrel housing extends from the base portion and surrounds the shaft and a bezel is attached to the end of the barrel housing. A friction or drag device threadedly engages the bezel and forces a collar against the shaft to control rotation of the shaft. The barrel housing is attached to the base by bolts, one of which extends centrally through the housing. A retainer is disposed in the housing and includes a groove for surrounding the core element so as to retain the core element in the groove in the circular drive member.

26 Claims, 7 Drawing Figures

INVENTOR.
Hans Wiegand
BY
Barnard, McGlynn & Reising
ATTORNEYS

INVENTOR.
Hans Wiegand

ACTUATOR ASSEMBLY

This invention relates to an actuator assembly of the type for longitudinally moving a flexible motion transmitting core element to transmit motion in a curved path and more specifically, to such an assembly utilized in a marine steering control system for steering the arm or tiller of a rudder or an outboard motor mounted at the stern. The actuator assembly of the instant invention is of the type utilized with a multi-stranded flexible core element or cable which includes a plurality of strands of wire wound together on a long lead with a projecting helix of uniform pitch and short lead wound on the exterior of the strands. The actuator utilizes a circular drive means or gear wheel having a groove extending peripherally thereabout with recesses in the groove for receiving the helical projection, or said another way, teeth are defined between the recesses for engaging the sides of the helical wire. Such prior art assemblies are shown in U.S. Pat. Nos. 2,767,596; 3,890,595; 3,135,130; and 3,550,469. The assemblies known to the prior art typically include a housing fabricated of metal parts secured together by bolts, screws or the like. One of the problems with such assemblies is that they may be dismantled by inexperienced mechanics and thereby cause warranty problems to manufacturers. At least one such prior art assembly is known to include a retainer member disposed about the circumference of the gear wheel to engage the motion transmitting core element. Such retainers, however, have flat, planar or cylindrical surfaces which are in line contact with the core element thus providing concentrated high loads which results in wear in the retainer allowing the core element to move radially out of the groove in the gear member.

It is an object and feature of this invention to provide an improved actuator assembly having a housing including a cover and a base with coacting means for snapping the cover and base into mechanical interlocking engagement with one another.

In correlation with the foregoing object and feature, it is another object and feature of this invention to provide such an actuator assembly including a retainer member having a groove therein and disposed about the groove in the drive member whereby the two grooves coact to retain the core element in position.

In correlation with the foregoing objects and features, it is another object and feature of this invention to provide such an actuator assembly having a generally circular housing with at least one connector extending tangentially from the housing and terminating in a threaded portion and being divided along a plane separating the cover and base whereby the connector is defined in part by the cover and in remainder by the base.

Other objects and attendant advantages of the present invention will be readily appreciated as the same becomes better understood by reference to the following detailed description when considered in connection with the accompanying drawings wherein.

Figure 1:
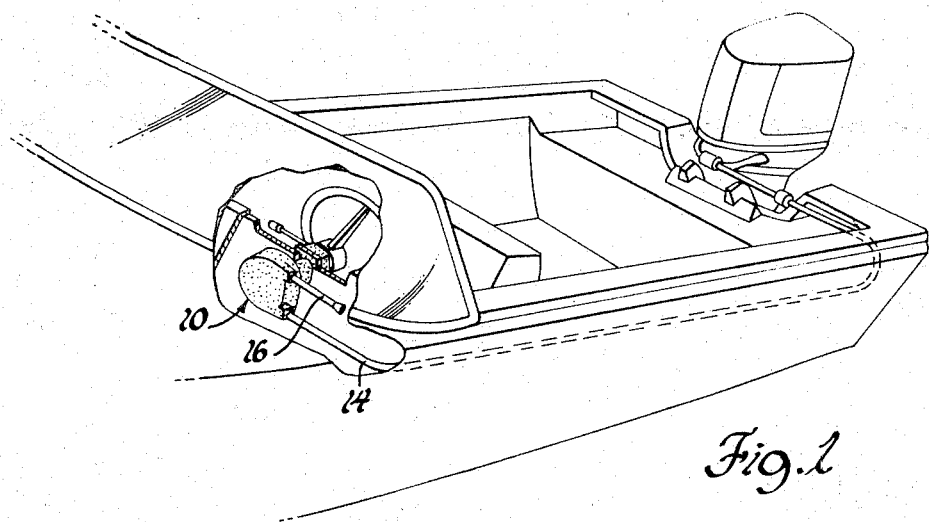
FIG. 1 is a fragmentary perspective view of the actuator assembly of the instant invention shown in a marine steering assembly.

Referring now to the drawings wherein like numerals indicate like or corresponding parts throughout the several views, a preferred embodiment of an actuator assembly constructed in accordance with the instant invention is generally shown at 10. The actuator assembly 10 is of the type for longitudinally moving a flexible motion transmitting cable or core element 12 within a tubular conduit 14. As explained above, the core element 12 comprises a plurality of wires stranded together on a long lead and with a helical wire wound thereabout on a short lead. The conduit or tubular member 14 extends from the front of the boat through a curved path to a position adjacent the engine mounted on the transom of the boat. One end of the core element is attached to the engine for rotating the engine to steer the boat and the other end of the core element extends through the actuator assembly 10 and terminates in an end which is movable in the tube 16, tube 16 being sealed at one end.

Figure 2:
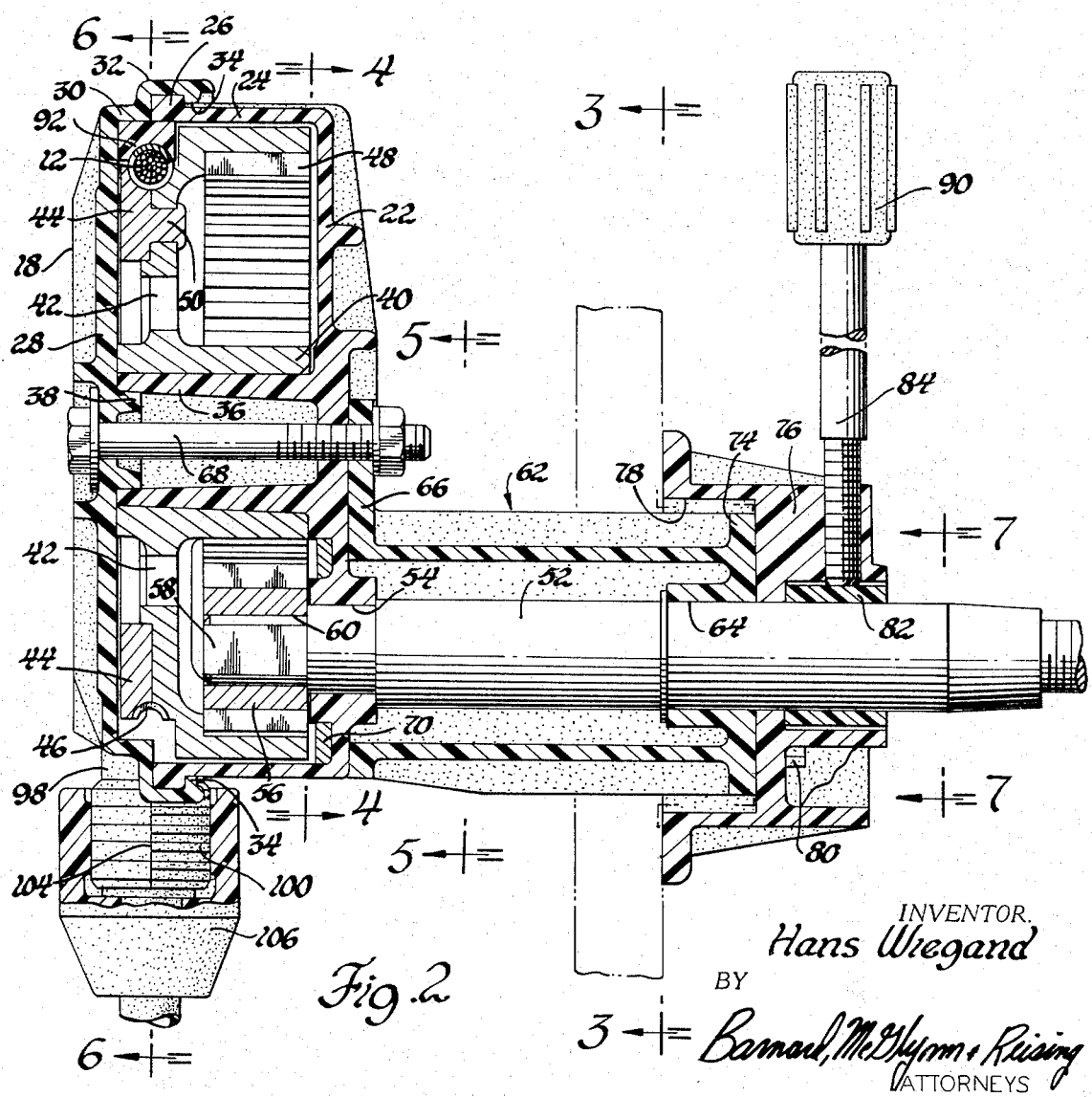
FIG. 2 is a cross-sectional view of a preferred embodiment of the actuator assembly in the instant invention.

The actuator assembly 10 includes a housing means comprising a cover 18 and a base 20, both of which are generally circular to define a circular housing means. The cover and base are made of plastic and include various strengthening ribs. The cover 18 and the base 20 have coacting means for snapping the cover 18 and the base 20 into mechanical interlocking engagement with one another. More specifically, the base has a bottom 22 and a cylindrical wall 24. A shoulder 26 extends circumferentially about at least a portion of the outer surface of the cylindrical wall 24 and defines a portion of the coacting means. The cover has a bottom 28 and a cylindrical side wall 30. As illustrated at the top of FIG. 2, the inner surfaces of the cylindrical walls 24 and 30 are contiguous or of the same cylinder. The cover 18 includes a tongue 32 extending about at least a portion of the circumference of the cylindrical wall 30 thereof and which tongue is snapped over the shoulder 26. In particular, the tongue includes a radially inwardly extending tapered locking rib 34 which snaps over and engages the outward edge of the shoulder 26. After the components to be described hereinafter are disposed within the housing, the cover and the base may be snapped together. Because of the coaction between the tongue or tapered rib 34 and shoulder 26, it is difficult to take the housing means apart without destroying or breaking the plastic cover and base. Thus, the system is one that may not be dismantled by the purchaser and therefore overcomes warranty problems with the manufacturer in that a malfunctioning unit will not be taken apart but returned to the manufacturer.

An axle 36 having an annular cross section extends from the bottom 22 of the base 20 toward the cover 18. A circular support, which is angular in cross section, extends from the bottom 28 of the cover 18 and is disposed within the end of the axle 36 for supporting the axle 36.

The actuator assembly 10 also includes a circular drive means rotatably supported on the axle 36 within the housing means and adapted to receive a motion transmitting core element 12. More specifically, the circular drive means includes a sleeve 40 which is in bearing engagement with the axle 36 and support means comprising the spokes 42 extending radially from the sleeve 40. The drive means also includes a grooved portion 44 having a peripheral groove 46 therein and supported by the spokes 42. The drive means also includes an internal gear 48 which is also supported by the spokes 42 and is disposed axially or to the side of the groove portion 44. As illustrated, the groove portion 44 is comprised of two parts which are secured together by the pins 50. The circular drive means or wheel may also be made in accordance with the teachings of U.S. Pat. No. 3,429,700.

The assembly also includes an input means for rotating the circular drive wheel. The input means includes the shaft 52 which extends through and is rotatably supported in a flanged opening 54 extending through the bottom 22 of the base 20. Also included in the input means is a pinion gear 56 which is secured to and rotated by the shaft 52 and is in meshing engagement with the internal gear 48. The pinion gear 56 rotates with the shaft 52 because the shaft has flat sides 58 which are interconnected by circular portions 60.

Figure 3:
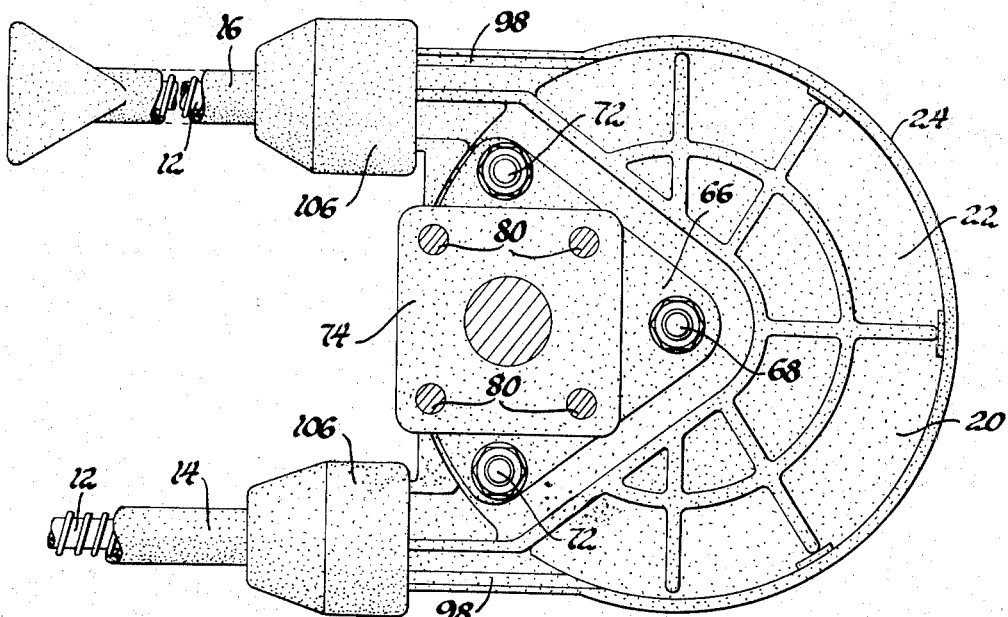
FIG. 3 is a view taken substantially along line 3—3 of FIG. 2.
Figure 4:
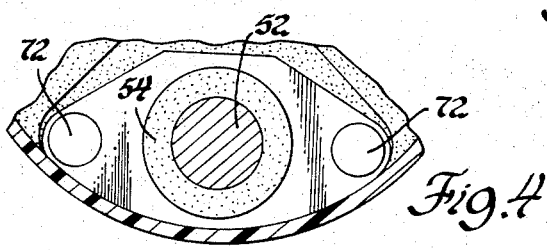
FIG. 4 is a fragmentary view taken substantially along line 4—4 of FIG. 2.
Figure 5:
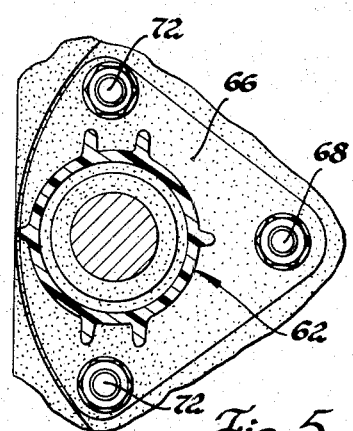
FIG. 5 is a fragmentary cross-sectional view taken substantially along line 5—5 of FIG. 2.
Figure 6:
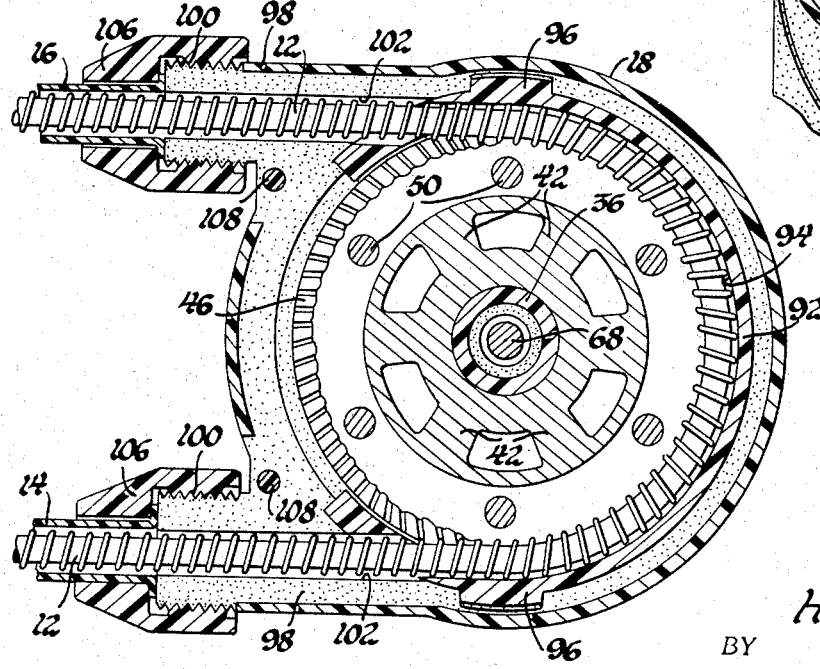
FIG. 6 is a cross-sectional view taken substantially along line 6—6 of FIG. 2.
Figure 7:
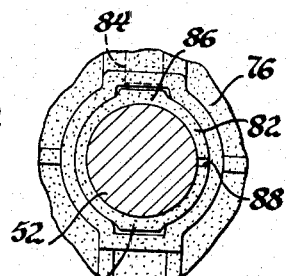
FIG. 7 is a fragmentary cross-sectional view taken substantially along line 7—7 of FIG. 2.

A barrel housing generally indicated at 62 surrounds the shaft 52 and extends from the base 20 to a distal end. The barrel housing 62 rotatably supports the shaft within the bearing surface 64 at the distal end thereof. The barrel housing 62 includes a flange 66 which engages the bottom 22 of the base 20. As best illustrated in FIGS. 3 and 5, the flange 66 is generally triangular in configuration with one of the sides being arcuate.

A bolt 68 extends through the flange 66 and through the bottom 22 of the base 20 and centrally through the axle 36 and through the bottom 28 of the cover 18. The bolt further holds the cover and base together and secures the flange 66 of the barrel housing 62 to the housing assembly. The barrel housing 62 is preferably made of a plastic impregnated with fiberglass.

A reinforcing metal plate 70 is disposed about the flange of the opening 54 and about the shaft 52 within the base 20 of the housing and includes studs 72 extending from the plate 70, through the bottom 22 of the base 20 and through the flange 66 of the barrel housing 62. The plate 70 provides a firm connection between the barrel housing 62 and the base 20.

The barrel housing 62 also includes a flange 74 at its distal end. A bezel 76 is disposed over the flange 74 and is adapted by having holes extending therethrough for connection to a bulkhead which is shown in phantom in FIG. 2. The bezel 76 has a pocket 78 therein and the flange 74 is disposed in the pocket 78 and the two coact to prevent relative rotation therebetween. More specifically, the pocket 78 is rectangular and has opposite sides which engage the opposite sides of the flange 74. Fasteners or bolts 80 extend through the bezel 76 and through the flange 74 and threadedly engage the barrel housing 62 for retaining the bezel to the barrel housing.

A collar 82 is supported by the bezel 76 and surrounds the shaft 52. There is also included tightening means comprising the threaded rod 84 for urging the collar 82 against the shaft 52 to control the freedom of rotation of the shaft 52. In other words, the collar 82 provides a drag or break. The collar includes diametrically opposite flats or shoulders 86 which are disposed in coacting recesses in the bezel 76 whereby the collar 82 is prevented from rotating with the shaft 50. The collar 82 has a split 88 so it may circumferentially contract about the shaft 52. The rod 84 threadedly engages a bore in the bezel which terminates in the upper recess disposed about the upper flat 86 and includes a handle or knob 90 for facilitating manual rotation.

Turning to the housing there is also included a retainer member 92 disposed within the housing. The retainer member 92 includes a groove 94 which is disposed oppositely from the groove 46. The retainer member 92 is disposed circumferentially about the major portion of the circular drive wheel. The retainer member includes a pair of lugs 96 which are disposed in recesses in the cover portion of the housing. The groove 94 is disposed about the helical wire of the core element 12 to provide a substantial surface for the helical wire to bear against and which surface retains the core element firmly in engagement with the groove 46. It will be noted that the retainer member is completely symmetrical about a plane which is perpendicular to the plane containing the groove 46. The retainer member 92 is also preferably made of plastic.

The housing means also includes a pair of connectors 98 which extend tangentially from the housing means and terminate in threaded portions 100. The connector portions 98 are generally parallel to one another and each has a passage 102 therealong through which the motion transmitting core element 12 is slidably disposed and may travel. The connectors 98 are divided along a plane as indicated at 104 in FIG. 2 which is the same plane that separates the cover and the base whereby each connector 98 is defined in part by the cover and in remainder by the base. Fittings 106 are threaded upon the threaded portion 100 of the connectors 98 to retain the tubing 14 and 16 to the housing. The importance of the connectors being divided is that because the components are made of plastic members and are not therefore precisely machined, after the base and covers are snapped together, the two halves of the threaded portion 100 of the connectors 98 tend to spring apart. Thus, when the fittings 102 are threaded thereon the two halves tend to move apart and form a biasing action retaining the fittings 106 thereon. This overcomes the problem associated with comparative metal assemblies wherein the fittings 106 have a tendency to vibrate and unthread from the metal connector portions.

The base has pins 108 integral therewith and extending therefrom and through alignment openings in the cover 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property or privilege is claimed are defined as follows:

1. An actuator assembly of the type for longitudinally moving a flexible motion transmitting core element to transmit motion in a curved path, said assembly comprising: housing means; a circular drive means rotatably supported in said housing means and adapted to receive a motion transmitting core element; and input means for rotating said drive means; said housing means including a cover and a base, said cover and said base having coacting means for snapping said cover and base into mechanical interlocking engagement with one another, an axle extending from one of said base and said cover and a support extending from the other of said base and said cover for coacting with said axle for supporting same, said circular drive means being rotatably supported on said axle.

2. An assembly as set forth in claim 1 wherein said cover and base are generally circular, said base has a bottom and a cylindrical wall with a shoulder extending about at least a portion of the circumference of the outer surface of said cylindrical wall, said shoulder being the coacting means on said base, said cover has a bottom and a cylindrical side wall, said coacting means on said cover including a tongue snapped over said shoulder.

3. As assembly as set forth in claim 2 wherein said tongue extends about at least a portion of the circumference of said cylindrical wall of said cover and includes a radially inwardly extending tapered locking rib snapped over and engaging said shoulder.

4. An assembly as set forth in claim 3 wherein said bottom of said base includes a flanged opening, said input means includes a shaft extending through and rotatably supported in said opening, said circular drive means including an internal gear, said input means further including a pinion gear secured to said shaft and in meshing engagement with said internal gear.

5. An assembly as set forth in claim 4 including a barrel housing surrounding said shaft and extending from said base to a distal end, said barrel housing rotatably supporting said shaft at said distal end.

6. An assembly as set forth in claim 5 wherein said barrel housing includes a flange engaging said bottom of said base, a bolt extending through said flange and through said bottom of said base and centrally through said axle and through said bottom of said cover.

7. An assembly as set forth in claim 6 wherein said housing means is made of plastic, a reinforcing plate disposed about said opening and said shaft within said base, studs extending from said plate and through said bottom of said base and through said flange of said barrel housing.

8. An assembly as set forth in claim 7 wherein said circular drive means includes; a sleeve portion in bearing engagement with said axle, support means extending radially from said sleeve, a grooved portion having a peripheral groove therein supported by said support means, said internal gear being supported by said support means axially of said grooved portion.

9. An assembly as set forth in claim 8 including a retainer member disposed within said housing means and having a groove therein disposed oppositely from said groove in said grooved portion, said retainer member being disposed circumferentially about at least a portion of said circular drive member.

10. An assembly as set forth in claim 9 including a pair of connectors extending tangentially from said housing means and terminating in threaded portions.

11. An assembly as set forth in claim 10 wherein said connector portions are generally parallel to one another.

12. An assembly as set forth in claim 10 wherein each of said connectors has a passage therealong through which the motion transmitting core element may travel.

13. An assembly as set forth in claim 12 wherein said connectors are divided along a plane separating said cover and base whereby each connector is defined in part by said cover and in remainder by said base.

14. An assembly as set forth in claim 13 wherein said barrel housing includes a flange at said distal end, a bezel disposed over said flange and adapted for connection to a bulkhead, fasteners interconnecting said bezel and said flange of said distal end of said barrel housing.

15. An assembly as set forth in claim 14 wherein said flange at said distal end of said barrel housing is disposed in a pocket in said bezel and the two coact to prevent relative rotation therebetween.

16. An assembly as set forth in claim 13 including a bezel attached to said distal end of said barrel housing, a collar supported by said bezel and engaging said shaft, tightening means for urging said collar against said shaft to control the freedom of rotation of said shaft.

17. An assembly as set forth in claim 16 wherein said collar surrounds said shaft and includes diametrically opposite flats disposed in recesses in said bezel whereby said collar is prevented from rotating.

18. An assembly as set forth in claim 17 wherein said tightening means comprises a rod threadedly engaging said bezel in a bore which terminates in one of said recesses, said rod having a handle for facilitating manual rotation thereof.

19. An assembly as set forth in claim 1 wherein said circular drive means includes a grooved portion having a peripheral groove extending thereabout and including a retainer member disposed within said housing means and having a groove therein disposed oppositely from said groove in said grooved portion whereby said grooves surround the motion transmitting core element and said retainer member retains the core element in said groove in said grooved portion of said circular drive means.

20. An assembly as set forth in claim 1 including a shaft extending into said housing means for rotating said circular drive means, a barrel housing surrounding said shaft and extending from said base to a distal end, said barrel housing rotatably supporting said shaft at said distal end and including a flange at said distal end, a bezel disposed over said flange and adapted for connection to a bulkhead.

21. An assembly as set forth in claim 20 wherein said flange at said distal end of said barrel housing is disposed in a pocket in said bezel and the two coact to prevent relative rotation therebetween.

22. An assembly as set forth in claim 1 wherein said housing means is generally circular and includes a pair of connectors extending tangentially from said housing means and terminating in threaded portions.

23. An assembly as set forth in claim 22 wherein said connectors are divided along a plane separating said cover and base whereby each connector is defined in part by said cover and in remainder by said base.

24. An assembly as set forth in claim 23 wherein each of said connectors has a passage therealong through which the motion transmitting core element may travel.

25. An actuator assembly of the type for longitudinally moving a flexible motion transmitting core element to transmit motion in a curved path, said assembly comprising; a generally circular housing, a circular drive means rotatably supported in said housing means and adapted to receive a motion transmitting core element, input means for rotating said drive means, said housing means including a cover and a base and at least one connector extending tangentially therefrom and terminating in a threaded portion, said connector having a passage therealong through which the core element may travel, said connector being divided along a plane separating said cover and said base whereby each connector is defined in part by said cover and in remainder by said base.

26. An assembly as set forth in claim 25 wherein said connector is circular in cross-section and is divided diametrically.

* * * * *